(12) United States Patent
Economy et al.

(10) Patent No.: US 12,395,480 B2
(45) Date of Patent: Aug. 19, 2025

(54) SYSTEMS AND METHODS FOR SUBSCRIPTION AND IDENTITY AUTHENTICATION MANAGEMENT

(71) Applicant: NIC.KL INC., Philadelphia, PA (US)

(72) Inventors: Theodore F. Economy, Philadelphia, PA (US); Sumorwuo Zaza, Philadelphia, PA (US); Jane Lee, Astoria, NY (US); Richard Alford, Hackettstown, NJ (US); Nicole Economy, Basking Ridge, NJ (US); Lauren Economy, Basking Ridge, NJ (US)

(73) Assignee: NIC.KL INC., Philadephia, PA (US)

( * ) Notice: Subject to any disclaimer, the term of this patent is extended or adjusted under 35 U.S.C. 154(b) by 0 days.

(21) Appl. No.: 17/767,556

(22) PCT Filed: Oct. 12, 2020

(86) PCT No.: PCT/US2020/055268
§ 371 (c)(1),
(2) Date: Apr. 8, 2022

(87) PCT Pub. No.: WO2021/072382
PCT Pub. Date: Apr. 15, 2021

(65) Prior Publication Data
US 2024/0089243 A1    Mar. 14, 2024

Related U.S. Application Data

(60) Provisional application No. 62/973,571, filed on Oct. 10, 2019.

(51) Int. Cl.
*H04L 9/40*         (2022.01)
*G06F 21/31*        (2013.01)

(52) U.S. Cl.
CPC .......... *H04L 63/0815* (2013.01); *G06F 21/31* (2013.01); *H04L 63/102* (2013.01); *H04L 63/105* (2013.01); *H04L 2463/101* (2013.01)

(58) Field of Classification Search
CPC . H04L 63/0815; H04L 63/102; H04L 63/105; H04L 2463/101; G06F 21/31; H04K 1/02
See application file for complete search history.

(56) References Cited

U.S. PATENT DOCUMENTS 6,950,521 B1 * 9/2005 Marcovici ........... H04W 12/122
                                                        713/169
7,886,000 B1   2/2011 Polis et al.
(Continued)

OTHER PUBLICATIONS

Pattabhiramaiah, Adithya, S. Sriram, and Puneet Manchanda. "Paywalls: Monetizing online content." Journal of marketing 83.2 (2019): 19-36.

(Continued)

*Primary Examiner* — Cheng-Feng Huang
(74) *Attorney, Agent, or Firm* — Tarolli, Sundheim, Covell & Tummino LLP

(57) ABSTRACT

Systems and methods can use subscription and identity authentication management to remove paywalls from websites. Login information for access to an application can be received from a user. The application can verify that the login information is associated with a subscriber account associated with a subscriber to the application. Instructions can be received to access a provider site from the user through the application. The application can determine that the provider site is associated with the subscriber account and the user; and then determine access credentials to the provider site based on a predetermined access scheme associated with the provider site. The access credentials can be injected into a paywall associated with the provider site.

18 Claims, 5 Drawing Sheets

(56) References Cited

U.S. PATENT DOCUMENTS

| | | | |
|---|---|---|---|
| 9,319,270 B2 | 4/2016 | Bestmann et al. | |
| 10,140,625 B2* | 11/2018 | Hudson | G06Q 30/0238 |
| 2010/0132019 A1 | 5/2010 | Hardt | |
| 2012/0209778 A1* | 8/2012 | Delany | H04L 63/102 |
| | | | 705/26.1 |
| 2013/0086670 A1* | 4/2013 | Vangpat | H04L 63/0815 |
| | | | 726/8 |
| 2014/0236846 A1* | 8/2014 | Melika | H04W 4/50 |
| | | | 705/310 |
| 2016/0352714 A1* | 12/2016 | Syed | H04L 67/306 |
| 2019/0114603 A1* | 4/2019 | Sharma | H04N 21/44204 |
| 2019/0386831 A1* | 12/2019 | Jamkhedkar | H04L 9/3213 |

OTHER PUBLICATIONS

Pattabhiramiah, Adithya, S. Sriram, and Puneet Manchanda. "Paywells: Monetizing online content." Journal of marketing 83.2 (2019): 19-36.

PCT International Search Report for corresponding International Application Serial No. PCT/US2020/055268, mailed Jan. 27, 2021, 1 page.

* cited by examiner

SYSTEMS AND METHODS FOR SUBSCRIPTION AND IDENTITY AUTHENTICATION MANAGEMENT

CROSS-REFERENCE TO RELATED APPLICATIONS

This application claims the benefit of U.S. Provisional Application No. 62/973,571, filed Oct. 10, 2019, entitled "Subscription and identity authentication management system". This provisional application is hereby incorporated by reference in its entirety for all purposes.

TECHNICAL FIELD

The present disclosure relates generally to paywalls, and more particularly, to systems and methods for subscription and identity authentication management to remove paywalls and/or other barriers from websites.

BACKGROUND

At least thirty million Americans work in industries where news and information are critical. Traditionally, these workers have gotten their news and information from newspapers and magazines. Publishing companies responsible for these newspapers and magazines monetize the news and information by requiring the workers to purchase subscriptions, of variable length and price, to access the given newspaper or magazine. As consumers have moved away from printed newspapers and magazines to access their necessary news and information, publishing companies have moved their newspapers and magazines online to account for the change in consumer habits. Many publishing companies have turned to paywalls to keep their revenue stream alive, requiring a subscription to access the news and information.

Paywalls have been employed to garner subscriptions to online content, thereby monetizing the online content. A paywall generally refers to a website feature (e.g., a pop up) that restricts access to online content until payment (e.g., a traditional subscription) is received. News and information are just an example of an industry that utilizes paywalls. Although paywalls were designed as a way to monetize websites, the truth is that when a potential consumer encounters a paywall, less than one percent of these potential customers actually subscribe when faced with the paywall. Purchasing access through a paywall is expensive, and the cost add up when subscriptions are made to multiple websites. Additionally, employers have little to no control over subscription and management costs incurred by employees (potential customers) or associated security concerns. Even if the potential customer let the employer buy access to the websites, the employer is faced with the fact that managing subscriptions is messy and buying access is expensive, as well as negotiating with multiple providers is time consuming.

SUMMARY

The present disclosure relates generally to paywalls, and, more particularly, to systems and methods for subscription and identity authentication management to remove paywalls and/or other barriers from websites. The systems and methods of the present disclosure can create, manage, manipulate, share, and fractionalize the online subscriptions and their related authentication credentials for intelligent, data driven, secure, and scalable delivery of the content to the user.

In one aspect, the present disclosure can include a method for removing a paywall from a website. The method can be executed by a system comprising a processor. Login information can be received from a user trying to log into an application. The login information can be verified as associated with a subscriber account that is associated with a subscriber to the application. Instructions can be received from the user instructing the application to access a provider site. The application can then determine that the provider site is associated with the subscriber account and the user, and then determine access credentials to the provider site based on a predetermined access scheme associated with the provider site. The application can then inject the access credentials into a paywall associated with the provider site, thereby granting access to content on the provider site.

In another aspect, the present disclosure can include a system that can remove a paywall from a website. The system includes a memory storing instructions and a processor configured to access the memory to execute the instructions. Upon execution of the instructions, the system can receive login information to an application from a user; verify that the login information is associated with a subscriber account associated with a subscriber to the application; receive instructions to access a provider site from the user through the application; determine that the provider site is associated with the subscriber account and the user; determine access credentials to the provider site based on a predetermined access scheme associated with the provider site; and inject the access credentials into a paywall associated with the provider site.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

Definitions

Figure 1:
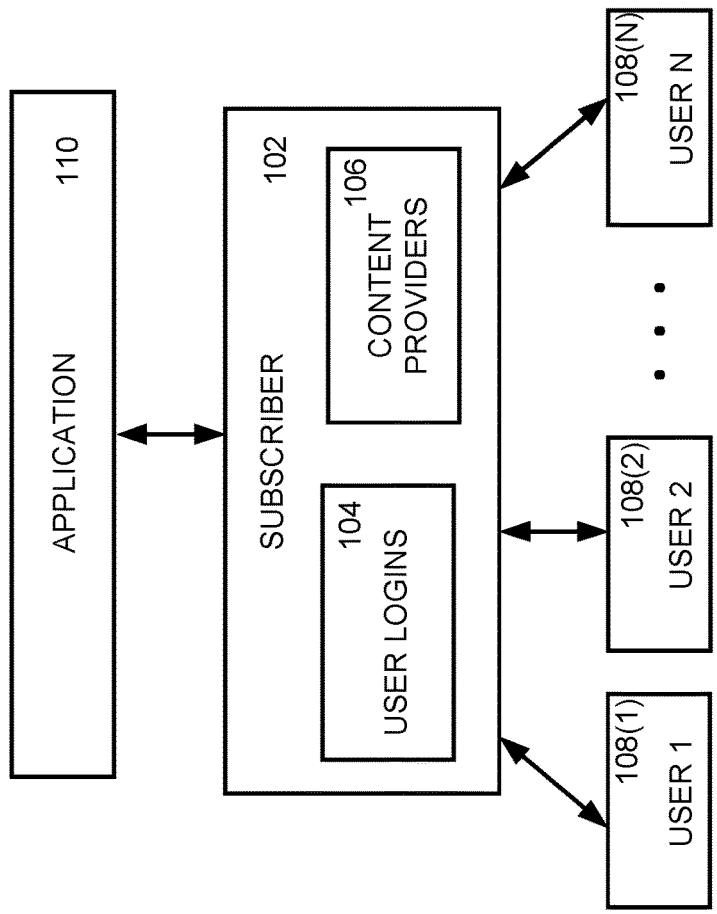
FIG. 1 is a diagram illustrating a system that that can remove a paywall from a website, according to an aspect of the present disclosure.

Unless defined otherwise, all technical and scientific terms used herein have the same meaning as is commonly understood by one of skill in the art to which the present disclosure pertains.

In the context of the present disclosure, the singular forms "a," "an" and "the" can also include the plural forms, unless the context clearly indicates otherwise.

The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure.

As used herein, the term "paywall" refers to a method of restricting access to content (e.g., news, information, research articles, weather, print, video, music, SaaS (Software as a Service), gaming, future content types, etc.) on a website (also referred to as a "provider site") to purchasers or paid subscribers. The term paywall can be more generally referred to as a barrier.

As used herein, the term "application" refers to one or more lines of software configured to provide a user interface that is presented to a user with details of a subscriber account that the user is allowed to visualize. The application also holds details of the subscriber account, including users, authorizations, user logins, subscriptions, provider sites, access schemes for the provider sites, and/or the like.

As used herein, the term "subscription" refers to an action of a subscriber making or agreeing to make an advance payment in order to receive access to content on a website (e.g., by removing a paywall). The subscription can be part of a "subscriber account", which can include multiple subscriptions.

As used herein, the term "provider site" refers to a website from a content provider with content (e.g., news, information, research articles, weather, print, video, music, SaaS (Software as a Service), gaming, future content types, etc.) thereon. A subscriber can have a subscription to a provider site to remove a paywall associated with the provider site. One or more provider sites can be associated with each subscription.

As used herein, the term "subscriber" refers to an entity that making or agreeing to make an advance payment in order to receive access to content (e.g., on a website).

As used herein, the term "user" can refer to a person who is permitted to access at least a portion of the subscriber account.

As used herein, the term "login information" refers to one or more credentials (e.g., a user name and a password) utilized by the user to access a portion of the subscriptions in the subscriber account that the user is authorized to access.

As used herein, the term "access credentials" refers to one or more credentials (determined based on the subscriber account and requirements of a website) utilized by the application to remove a paywall from the website.

As used herein, the term "injection" refers to the introduction of something—for example, the application can inject the access credentials into the paywall according to conditions of the paywall and the subscription, for example.

Overview

The present disclosure relates generally to paywalls (or other barriers), used to restrict access to content (e.g., news, information, research articles, software downloads, etc.) on a website so that only purchasers or paid subscribers can access the content. At least thirty million Americans work in industries where the content stored behind paywalls is critical to their jobs, but a majority of these individuals will navigate away upon encountering a paywall. Even if the individual were to have an employer buy access to the websites housing the content, the employer is faced with the fact that managing subscriptions is messy and buying access is expensive, but negotiating with multiple providers is time consuming. The systems and methods of the present disclosure simplify an employer's job managing subscriptions and buying access to different content providers. Operators of an application used to implement the systems and methods can negotiate with different content providers and allow users authorized by the employer to get past the annoying paywalls quickly and easily so that the content is readily available for critical job-related consumption. The application provides a valuable service by making it easier for individuals to get the information they need while saving employers money.

More particularly, the present disclosure relates to systems and methods for subscription and identity authentication management to remove paywalls and/or other barriers from websites. The systems and method can employ an application to perform the subscription and identity authentication management features, as well as remove the paywalls and/or other barriers from the websites. Indeed, the application can be used for creating, managing, manipulating, sharing and fractionalizing online subscriptions and their related authentication credentials for intelligent, data driven, secure, and scalable delivery to multiple users, typically via a linked single parent account. For example, a user can have certain static subscriptions linked to their single parent account, identity or other, along with a substantial list of subscriptions and related authentication credentials that can be dynamically linked and unlinked as required and/or determined by the subscriber thereby breaking traditional barriers and limitations of traditional internet content delivery.

Systems

One aspect of the present disclosure includes a system 100 that can remove a paywall from a website. Paywalls (or other barriers), used to restrict access to content (e.g., news, information, research articles, software downloads, etc.) on a website so that only purchasers or paid subscribers can access the content. The system 100 can provide subscription and identity authentication management to remove paywalls and/or other barriers from websites. For example, the system 100 employ an application 110 to perform the subscription and identity authentication management features, as well as remove the paywalls and/or other barriers from the websites. Indeed, the application 110 can be used for creating, managing, manipulating, sharing and fractionalizing online subscriptions and their related authentication credentials for intelligent, data driven, secure, and scalable delivery to a user, typically via a linked single parent account (e.g., one or more of user 1-N 108(1-N) associated with a subscriber 102).

The subscriber 102 can be associated with a plurality of user logins 104, each associated with one of a plurality of users 108 (1-N). Each of the users 108(1-N) can have associated permissions to access content from one or more content providers 106. Although the user logins 104 and the content providers 106 are shown as being associated with the subscriber, it will be understood that these can additionally or alternatively be associated with the application 112. Moreover, it should be noted that each user 108(1-N) can be associated with one or more computing devices. Additionally, the subscriber 102 can also be associated with one or more computing devices.

The application 112 can be stored on one or more non-transitory memories (or memory devices) and executed by one or more processors that can access the one or more non-transitory memories. The one or more memory devices and the one or more processors can be remote from each other and/or remote from the users 108 (1-N) and/or remote from the subscriber 102. At least a portion of the application 112 can be installed on computers associated with the users 108 (1-N) (e.g., as an extension associated with an Internet browser program). At least another portion of the application 112 can be run remotely. Storage (e.g., databases) associated with the application 112 can be located at a one or more remote locations.

The "computers", as well as the one or more non-transitory memories and one or more processors are examples of one or more hardware devices that can be part of the system 100 and capable of implementing at least a portion of the system 100. For example, the one or more hardware devices can include various systems and subsystems and can be a personal computer, a laptop computer, a workstation, a computer system, an application-specific integrated circuit (ASIC), a server BladeCenter, a server farm, etc., and may be employed by the users 108(1-N), the subscriber 102, and/or the application 110. Moreover, as described herein, the term "non-transitory memory" can represent one or more memories and/or memory devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data. For example, the memory devices can store data, programs, instructions, database queries in text or compiled form, and any other information that may be needed to operate a computer. The memory devices can be implemented as computer-readable media (integrated or removable), such as a memory card, disk drive, compact disk (CD), or server accessible over a network. In certain examples, the memory devices can comprise text, images, video, and/or audio, portions of which can be available in formats comprehensible to human beings.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Figure 2:
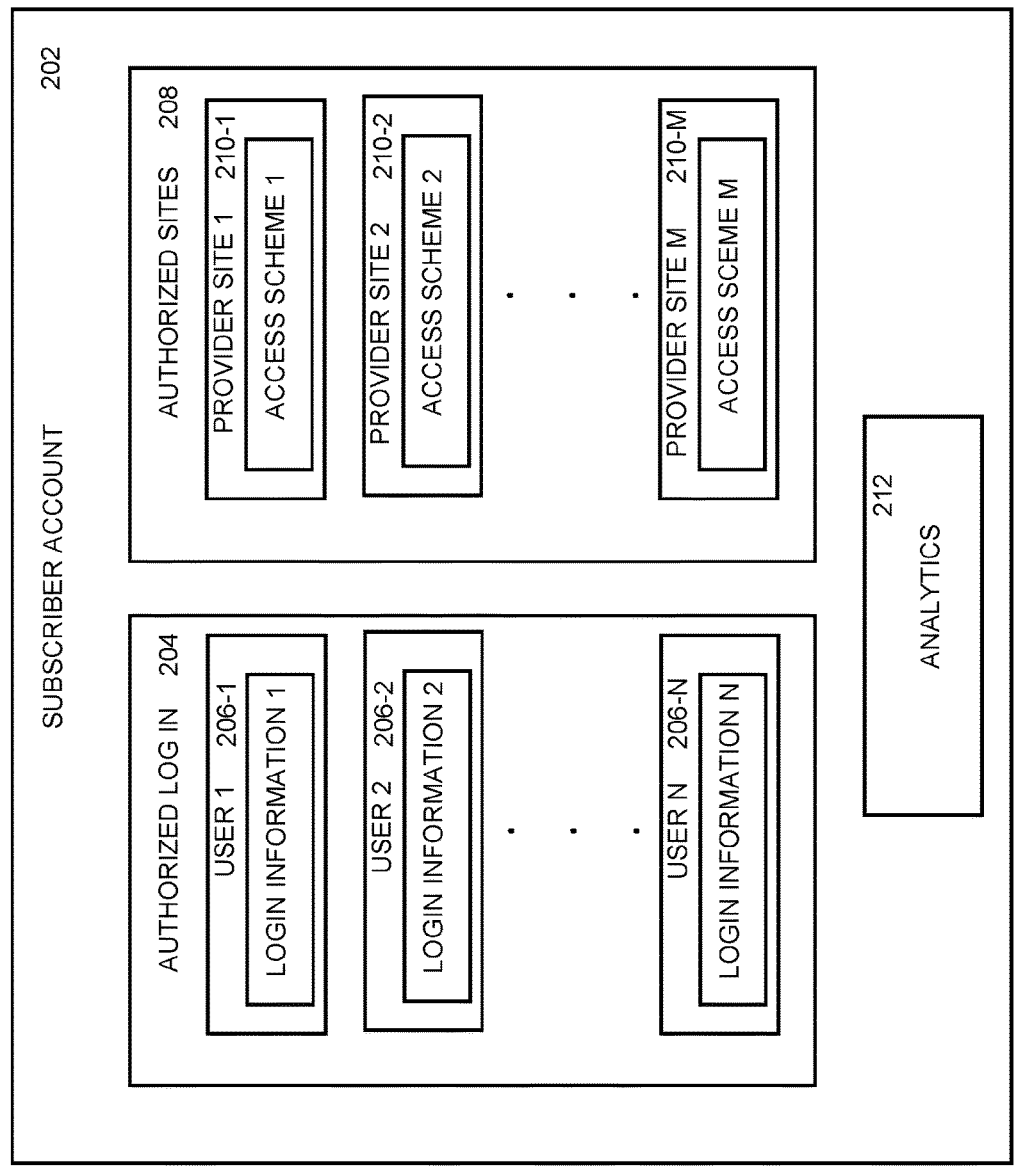
FIG. 2-4 are diagrams illustrating an example of the application of FIG. 1 and its related functionality.

An example back side 200 of the application for the subscriber account 202 is shown in FIG. 2. The application can be associated with a plurality of different subscriber accounts, but only a single subscriber account 202 (corresponding to subscriber 102) is shown in FIG. 2. The certain subscriber account 202 can be associated with a number (N, an integer that is one or more) of authorized logins 204 that can be associated with different users (e.g., user 1-N (206-1-206-N)), each with different login information (LOGIN INFORMATION 1-N). The login information can include a username, email, password, or the like—any information necessary to grant access to the application 110. Application (back side 200) can store information related to previously-assigned permissions for each user.

The permissions can be related to the authorized sites 208. The subscriber account 202 can be associated with a number (M, an integer that is one or more) of provider sites (provider site 1-M (210-1-210-M)). For example, user 1 206-1 can be allowed to access each of provider site 1 210-1 through provider site M 210-M, but user 2 may only be allowed to access provider site 1 210-1 and provider site 2 210-2. The permissions can be preset by an administrator of the subscriber account 202. Each of the provider sites (210-1-210-M) can be associated with a certain access scheme (access scheme 1-access scheme M). The access schemes can be different according to different provider sites.

The back side 200 of the application can store data and information in analytics. For example, the analytics can include the predefined cost associated with each of the provider sites (210-1-210-N). The cost can be a flat periodic fee and/or a fee for each access. The application 110 can store information about the fee within the analytics 212. The analytics 212 can also house information related to which users access which site, the cost incurred by each user, the length of time spent on each site. The analytics can also include information about the various access schemes for the different provider sites. The analytics 112 can be used by the subscriber 102 to better define the permissions and/or by one or more of the providers.

Figure 3:
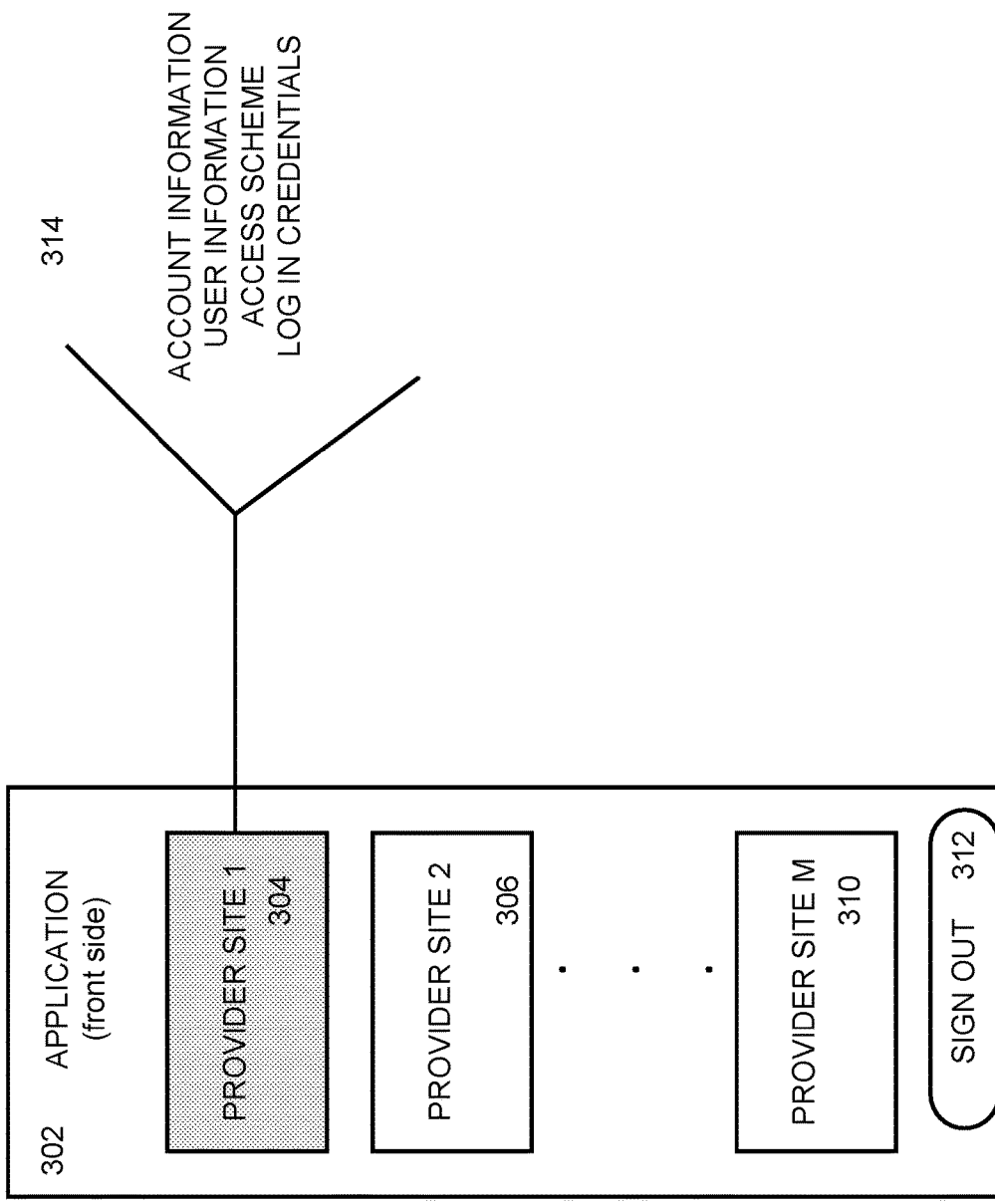

FIG. 3 shows an example of the front side 300 of the application 302 that is visible to the user. The front side 300 of the application 302 can be installed locally to the user, while the back side 200 is remote from the user. Graphical representations of the different provider sites (e.g., 304-310) can be visible to the user. When one of the provider sites (e.g., provider site 1, 304) has been selected by the user, the back side of the application can find information 304 associated with logging in to the chosen provider site (e.g., provider site 1, 304). The information 314 can include at least account information, user information, the access scheme for the certain provider site, and login credentials for the provider site. The user can sign in or out of the application (sign out is shown at 312 and is only available when the user is signed into the application).

Figure 4:
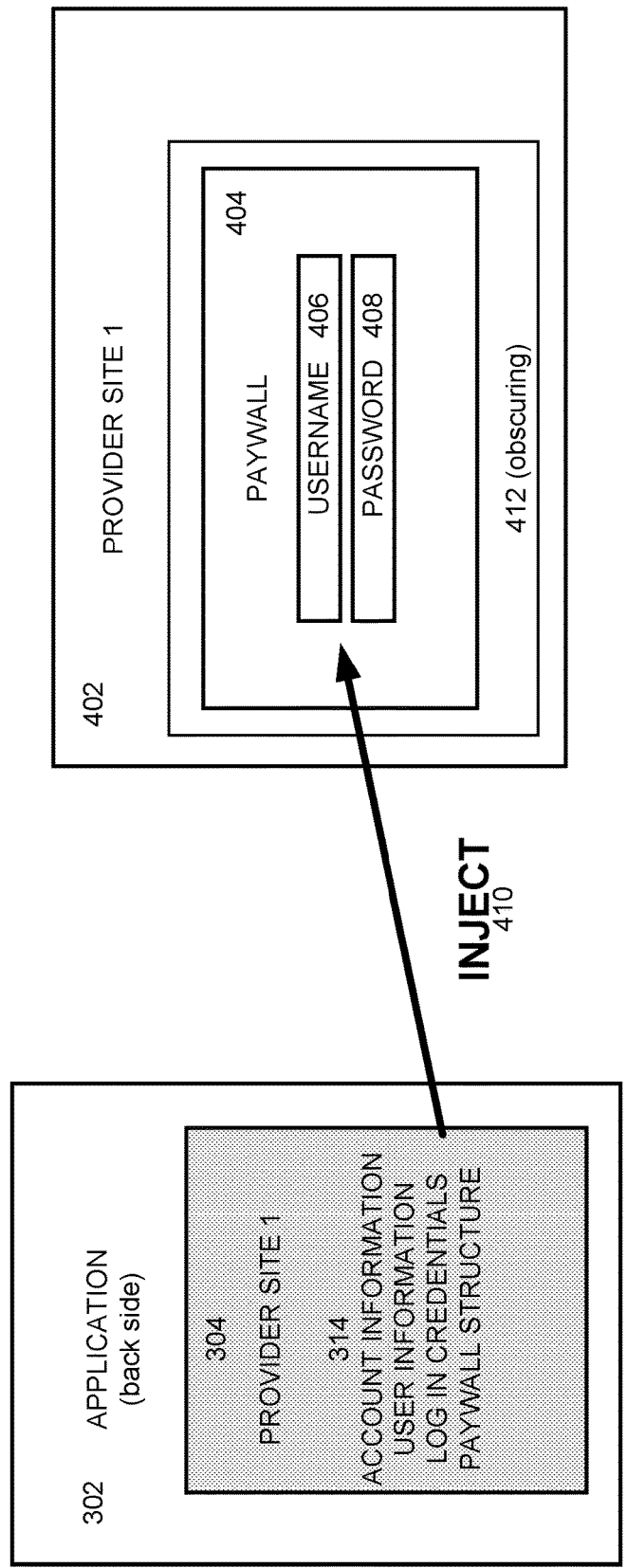
Figure 5:
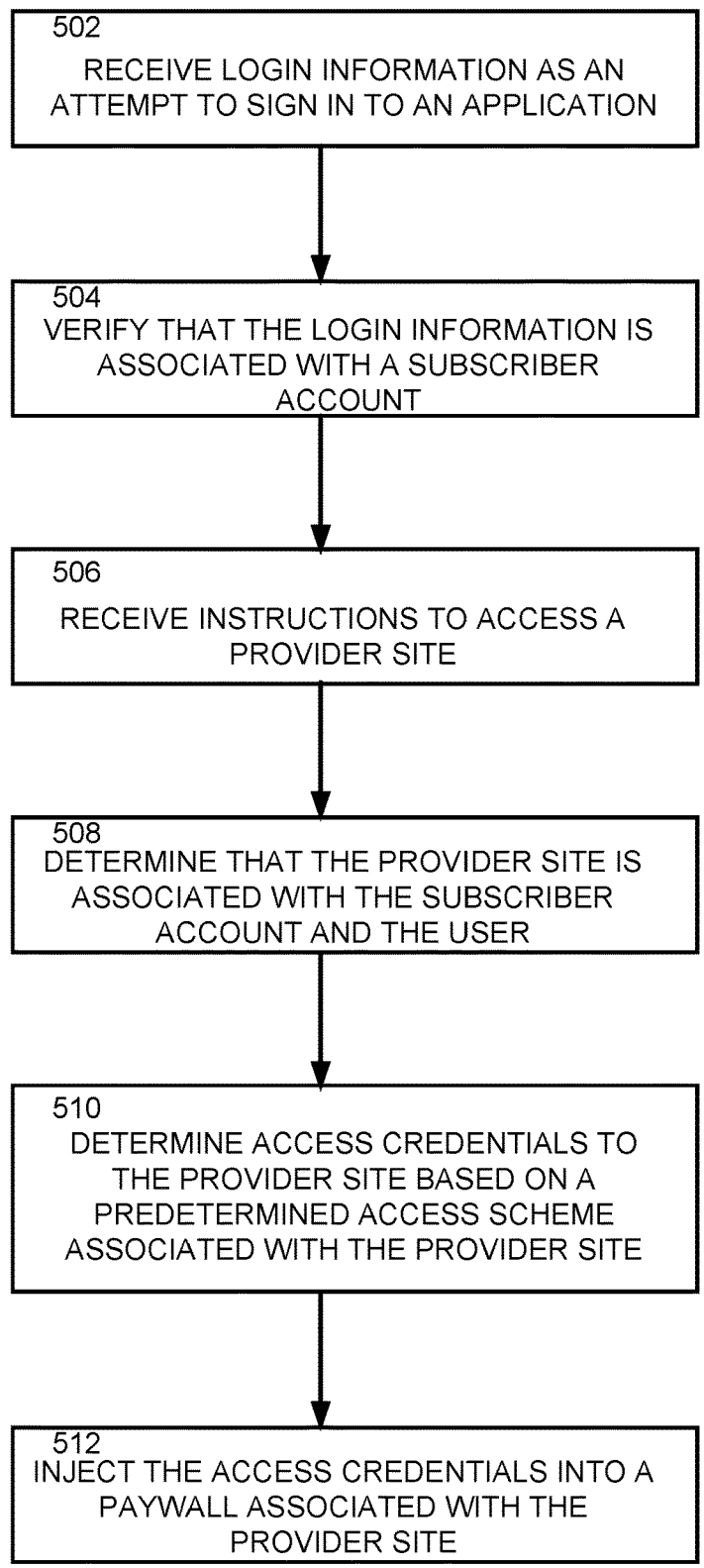
FIG. 5 is a process flow diagram illustrating a method for removing a paywall from a website, according to another aspect of the present disclosure.

FIG. 4 shows an example 400 of how the application 302 (back side 300) can remove the paywall from the provider site 1 402. The application 302 obscures or camouflages 412 the paywall so the user is unable to see the workings that occur behind the camouflage. For example, the camouflage can be an opaque overlay of at least the paywall. The camouflage can hide the aspects of the paywall removal— e.g., so the user does not become aware of the access scheme or the paywall structure that is used by the application (back side) 302 to remove the paywall 404. After removal of the paywall, the camouflage can be removed and the site can be accessed and viewed without the paywall.

Notably, the system uses transformations to remove the paywall. The user logs in to the application (e.g., according to a sign in procedure with login credentials). The login credentials used by the user to access the application 110 can be assigned by the subscriber 102. The application 110 can verify that the login credentials associated with the user (e.g., user 1 108(1)) are associated with the subscriber account and verify any authorizations related to the user. The application can associate the user with unique permissions within the subscriber account. For example, these unique permissions can be granted by an administrator of the subscriber account. If authorized, the application can access a provider site upon receiving instructions from the user to access the provider site. In this case, the user is one of the authorized users for the specific provider site, and the specific provider site is one of the providers sites associated with the subscriber application. Additionally, if the user has previously logged into the application and received an identity token from the application that has not expired, then the user may continue to access the specific provider site without logging into the application again.

The application can determine that the provider site is associated with the subscriber account and the user (e.g., that the user has permissions to access the provider site). If the application determines the user has the appropriate permissions, then the application can determine access credentials for the provider site based on a predetermined access scheme associated with the provider site. For example, the access credentials can be used for a round-robin authentication scheme, a one-to-one authentication scheme, or a group authorization scheme (e.g., set by the provider site). The access credentials can be changed by the application on a regular basis. The access credentials and/or the authorization scheme can be used to log in to the provider site.

The application can inject the access credentials into a paywall associated with the provider site. The injection (e.g., the logging into the provider) can be invisible to the user (e.g., so the user cannot see the credentials being used to log into the provider site). After the injection, the application can provide the user with access to the provider site based on the access credentials. However, at any step, the access may be denied based on the user lacking any required permissions. As another example, the access can be denied if the subscriber account is associated with a limited number of licenses (e.g., to the application, the provider site, etc.) and the limited number of licenses are all being used at that time.

Methods

Another aspect of the present disclosure can include a method 500 for removing a paywall from a website (e.g., using the system 100 shown in FIG. 1 and in the examples of FIGS. 2-4). The method 500 is illustrated as process flow diagrams with flowchart illustrations. For purposes of simplicity, the method 500 is shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the method 500.

Although a flowchart can describe the operations as a sequential process, many of the operations can be performed in parallel or concurrently. In addition, the order of the operations can be re-arranged. A process is terminated when its operations are completed, but can have additional steps not included in the figure. A process can correspond to a method, a function, a procedure, a subroutine, a subprogram, etc. When a process corresponds to a function, its termination corresponds to a return of the function to the calling function or the main function.

One or more blocks of the respective flowchart illustrations, and combinations of blocks in the flowchart illustrations, can be implemented by computer program instructions. These computer program instructions can be stored in memory and provided to a processor of a general purpose computer, special purpose computer, and/or other programmable data processing apparatus to produce a machine, such that the instructions, which execute via the processor of the computer and/or other programmable data processing apparatus, create mechanisms for implementing the steps/acts specified in the flowchart blocks and/or the associated description. In other words, the steps/acts can be implemented by a system comprising a processor that can access the computer-executable instructions that are stored in a non-transitory memory.

The method 500 of the present disclosure may be embodied in hardware and/or in software (including firmware, resident software, micro-code, etc.). Furthermore, aspects of the present disclosure may take the form of a computer program product on a computer-usable or computer-readable storage medium having computer-usable or computer-readable program code embodied in the medium for use by or in connection with an instruction execution system. A computer-usable or computer-readable medium may be any non-transitory medium that can contain or store the program for use by or in connection with the instruction or execution of a system, apparatus, or device.

At 502, an application can receive login information from a user attempting to sign into an application. At 504, the application can verify that the login information is associated with a subscriber account associated with a subscriber to the application. The subscriber account can be associated with a subscriber to the application (e.g., an employer) and the subscriber account can be associated with one or more authorized users (e.g., employees). The one or more authorized users can have unique permissions related to the subscriber account. For example, these unique permissions can be granted by an administrator of the subscriber account. At 506, the application can receive instructions to access a provider site from the user. In this case, the user is one of the authorized users for this provider site, and this provider site is one of the providers sites associated with the subscriber application. It should be noted that 502, 504, and 506 can be performed in any order. Additionally, 502 and 504 may not be necessary if the user has previously logged into the application and the application has sent the user an identity token that has not expired.

At 508, the application can determine that the provider site is associated with the subscriber account and the user (that the user has permissions to access the provider site). At 510, the application can determine access credentials to the provider site based on a predetermined access scheme associated with the provider site. For example, the access credentials can be used for a round-robin authentication scheme, a one-to-one authentication scheme, or a group authorization scheme (e.g., set by the provider site). The application can change the access credentials on a regular basis. The application can use the access credentials and/or the authorization scheme to log the user into the provider site.

At 512, the application can inject the access credentials into a paywall associated with the provider site. The injection (e.g., the logging into the provider) can be invisible to the user (e.g., so the user cannot see the credentials being used to log into the provider site). After the injection, the application can provide the user with access to the provider site based on the access credentials. However, at any step, the application my deny the user access based on the user lacking any required permissions. As another example, the application can deny the user's access if the subscriber account is associated with a limited number of licenses (e.g., to the application, the provider site, etc.) and the limited number of licenses are being used at that given time.

EXAMPLE

The following example shows a simple example use of the application (an Extension for Google's Chrome browser). An employer can provide a digital subscription to one or more employees (or users) via the application. The employer (or an individual serving as the employer's Administrator) can curate publishers/articles to include in the offerings to the employees, as well as determine which employees receive which publications/articles. The employee needs to click on an application (e.g., an extension for the Chrome browser) and log in with their unique permissions to bring up the unique content set available to them, then simply click on the given publisher/article to launch that item. Notably, the application (or an entity associated with the application) negotiates discounted subscriptions with publishers within its network, then passes at least a portion of the savings along to the employer.

To use the application, the application is first downloaded and installed via the Chrome Web Store (or another applicable web store if not a Chrome extension). The user logs into the application and is granted a token that is stored in the user's device and stays valid for a predetermined time period and is used for subsequent authentication without needing typical login credentials (e.g., username or email and password). The user maintains a "logged in" status on the device until the token expires on the device or the token expires, is revoked, or the user simply signs out.

The application then queries the backend database through a database call using the token for authentication and identifying the user and their authorized publishers/articles. Once authenticated, the application displays available websites (also referred to as properties) to the user, the user then selects the desired website with the desired content (from a certain publisher) and the application commences with first covering the site to be logged into with an opaque overlay with appropriate messaging (e.g., "One moment . . . "), then continues with the login injection process (e.g., a JavaScript process). Using a predetermined script to navigate the process of entering username (typically email) and password with required button clicks, checks, focus, etc., the application effectively logs in the user to the site and the overlay is removed. While the application injects the credentials and related activities, the opaque overlay covers the website login credentials to mask the username password that are being used. Additionally, the application disables autosave of username and password to prevent the user from subsequently using credentials directly with the desired website. The passwords are automatically periodically reset on the backend via a similar injection process as the login, therefore nullifying any previous username and password combination. In some instances, when the user hits a paywall, the application may have the capability to know the origin domain of the site and programmatically launch the login sequence for that publisher thereby automatically breaching the paywall. As another example, the application can use anonymized email addresses to create user accounts with various publishers (similar to Craig's List) and provide transparent passthroughs from anonymized to actual email addresses.

The user has then effectively crossed the paywall barrier with a single click allowing the user to get to the desired information without paying at the paywall. In addition to baseline functionality as described above the application also contains and records anonymized analytics that can be used by the subscriber, by the provider, or the like.

Example Technical Architecture

Technical Architecture, Development Tools, Version Control

The methods and systems described herein lend itself best to the LAMP architecture generic software stack model with various best practice client side languages, libraries, and methodologies such as JavaScript and AJAX, to name a few.

Both development and production hosting for a system such as this is best served by a tier 1 provider such as Digital Ocean or AWS to ensure 100% uptime and disaster mitigation.

Server Side Implementation

The server side of the system is built on the industry leading best practice LAMP stack. LAMP (Linux, Apache, MySQL, PHP) is named as an acronym for the names of its original four open-source components: the Linux operating system, the Apache HTTP Server, the MySQL relational database management system (RDBMS), and the PHP programming language.

Linux

Linux is a Unix-like computer operating system assembled under the model of free and open-source software development and distribution. Linux is the premier "gold standard" server operating system in use today. It has been broadly adopted and is in use in systems ranging from small embedded wearable devices, to large scale corporate, banking, science, military and supercomputer implementations. Linux is currently used in 99.6% of the top 500 supercomputers in the world which speaks volumes about the robustness, flexibility, speed and scalability of the operating system.

Apache

The Apache HTTP server is the world's most used web software serving application. It is responsible for all external browser interaction with the system. Apache supports a variety of features, many implemented as compiled modules which extend the core functionality. These can range from server-side programming language support to authentication schemes. Some common language interfaces support Perl, Python, Tcl, and PHP. Popular authentication modules include mod_access, mod_auth, mod_digest, and mod_auth_digest, the successor to mod_digest. A sample of other features include Secure Sockets Layer and Transport Layer Security support (mod_ssl), a proxy module (mod_proxy), a URL rewriting module (mod_rewrite), custom log files (mod_log_config), and filtering support (mod_include and mod_ext_filter).

MySQL

MySQL is an advanced Relational Database Management System RDBMS that has been widely adopted for relational database applications ranging from simple standalone applications to extremely large-scale implementations by companies including as Facebook, Twitter, YouTube and Google. MySQL employs the Structured Query Language, allowing for complex relational queries on given data sets. MySQL also utilizes the latest technologies in scalability, speed, robustness, security and redundancy.

PHP

PHP which stands for hypertext preprocessor is the server-side object-oriented language of choice for scalable and secure modern websites. The PHP language has been in existence since 1995 and has matured into a very solid and robust server-side web development object-oriented language complete with all modern features. It is estimated that over 80% of all websites are built using PHP. It is used in a variety of modern websites from small to the extremely high traffic sites, such as Wikipedia, Facebook, Yahoo, etc.

LAMP Hosting Implementation

The LAMP components are largely interchangeable and not limited to the original selection. As a solution stack, LAMP is currently the best architecture for building highly scalable robust web-based systems. The following high-level diagram illustrates the connectivity of a single server LAMP stack implementation.

Utilization of the LAMP stack, powered by industry leading high availability hosting solutions from companies such as Digital Ocean or Amazon Web Services (AWS) and others, allows for a virtually limitless scalable robust solution. A typical architecture of a high availability, highly scalable system is shown in the diagram below. This diagram illustrates the concept of a load balancer being able to intelligently route traffic to multiple servers to distribute workload. This is accomplished via the use of a redundant load balancer system which employs a floating IP scenario. A Floating IP is an IP address that can be instantly moved from one load balancer (or server instance) to another in the same data center network. Part of a highly available infrastructure is being able to immediately point an IP address to a redundant load balancer which can intelligently route traffic to one of many redundant application servers.

Further defining the Server-Side implementation requires a description of the Model View Controller Software methodology employed in a system like this. Model View Controller (MVC) is a software methodology for implementing data driven user interfaces on computers. Specifically, it divides a given application into three interconnected modules—Model, View, & Controller. The MVC design pattern decouples these major components allowing for efficient code reuse and parallel development. Traditionally used for desktop graphical user interfaces (GUIs), this architecture has become popular for designing web applications as well as mobile, desktop, and other clients. Popular programming languages like Java, C#, Ruby, PHP, and others have popular MVC frameworks that are currently being used in web application development straight out of the box.

MVC Components

The Model is the hub of the MVC design methodology. It encapsulates the application's essence with respect to data requirements and business rules and processes. In other words, it is solely responsible for managing the data, logic, and rules of the application. Thus, decoupling the presentation of data from the actual business rules and processes.

The view can be thought of as the presentation and user input component of the MVC design methodology.

The third part, the controller, is the "go between" of the model and the view. In essence decoupling them both. This provides a powerful architectural advantage in that if you make changes within the model those changes will inherently propagate to whatever type of view device that may be used within a system (i.e. browser, mobile app, client site application, etc.)

MVC Interactions

As mentioned, the model contains the actual datasets along with relevant business rules and process definitions. It has the ability to receive input from the controller than intelligently processes that input through the application's business rules and processes as defined within the model. The model then passes the data back to the view, allowing the view to render the data is it sees fit. Lastly, the user of an application can be thought of as the 4th component of the MVC model.

Laravel MVC PHP Framework

Many popular MVC web development frameworks exist but the most popular and widely preferred among the PHP development community is the Laravel PHP MVC framework which is recommended for this system. It has gained significant traction, praise, and adoption in the past few years and is widely accepted as "the best" modern PHP MVC framework. In addition to the core inherent benefits of a MVC architecture/methodology. The Laravel framework increases efficiencies and robustness of development by using prebuilt and proven libraries for common tasks used in the majority of web projects, such as:

Simple, fast routing engine
Robust and secure user management system
Powerful dependency injection container
Multiple back-ends for session and cache storage
Database agnostic schema migrations
Robust background job processing
Real-time event broadcasting
Integration libraries for leading third party providers such as MailGun, Mandrill, Sendgrid, Stripe, intercom, etc.
. . . .
Simple, Secure and scalable API (Application Programing Interface) capabilities Client-Side Implementation Client-Side implementation refers to the JavaScript software that actually executes on the user's computer initially as the Chrome Extension as compared to the Server. Since the server-side software essentially returns a stateless (non dynamic) JSON data set or web page the client-side software is tasked to deliver state or event related activities to the browser. These are typically graphical or user interface in nature but are also often used to call server-side code via AJAX to dynamically populate a web page without the need of refreshing the entire page. The system's code base will utilize JavaScript and several related libraries to deliver a very modern and innovative user experience. Noteworthy JavaScript libraries used in this system include but are not limited to:

jQuery—Cross platform JavaScript library for providing richer UI experience
AJAX—Asynchronous JavaScript and XML used to create event driven updates to the browser experience
Chrome Extension Libraries Development Tools Recommended Development toolset includes:
WebStorm, Php Storm, DataGrip leading integrated development environments
Atom, Brackets & bbEdit Text Editors—Industry leading text editors
MySql Workbench—MySql realtime query and database management tool
Laravel Framework—Premier PHP MVC Framework
GitHub—Source & Revision Control
LaravelForge—Deployment management system
DigitalOcean—Virtual private server integration network (primarily used for dev)
AWS Virtual private server integration network (primarily used for production)
MailGun—mailing system
Page Redirects—This feature allows us to prohibit the user from reaching certain pages such as account related pages. When a user attempts to view a restricted page, the system forces a redirect to a desired page. A list of restricted pages per site are maintained in a database table for maximum flexibility.
Cookie management—Cookies for each site are also maintained within the database which in some cases can facilitate logging out and or session authentication.
Contextual overlay—While the system is logging the user in, we cover the actual login page with an overlay that can contain contextual dynamic text to message to the user.
Allow/Block Emails at registration—The system has an allow and/or block email functionality that allows us to block or allow certain domains or specific emails. This is important since it allows us to target enterprise organizations as well as, blocking non work emails. For example, Gmail, yahoo, etc.

From the above description, those skilled in the art will perceive improvements, changes and modifications. Such improvements, changes and modifications are within the skill of one in the art and are intended to be covered by the appended claims.

What is claimed is:

1. A method for removing paywalls associated with a plurality of provider sites to access subscribed content on the plurality of provider sites, the method comprising:
  receiving, by a system comprising a processor, login information to an application from a user, wherein the user is an authorized user of a multi-user subscriber account, wherein the multi-user subscriber account is associated with a subscriber to the application having a plurality of users and the plurality of users of the multi-user subscriber account each have different associated permissions to access content from one or more of the plurality of provider sites through the application, wherein the user is associated with at least one associated permission to access content from one or more of the plurality of provider sites;
  verifying, by the system, that the login information is associated with the multi-user subscriber account associated with the subscriber to the application;
  receiving, by the system, instructions to access the one or more of the plurality of provider sites from the user through the application;
  determining, by the system, that the one or more of the plurality of provider sites are associated with the multi-user subscriber account and the at least one associated permission of the user from the different associated permissions of each user of the plurality of users of the multi-user subscriber account;
  determining, by the system, access credentials to the one or more of the plurality of provider sites based on a predetermined access scheme associated with the one or more of the plurality of provider sites; and
  injecting, by the system, the access credentials into the paywall associated with the one or more of the plurality of provider sites via the application based on the at least one associated permission.

2. The method of claim 1, further comprising providing to the user, by the system, access to the provider site based on the access credentials to the one or more of the plurality of provider sites.

3. The method of claim 1, further comprising disabling access to the one or more of the plurality of provider sites to the user, by the system, based on the user not having permission to access the one or more of the plurality of provider sites in the multi-user subscriber account.

4. The method of claim 1, wherein the access credentials comprise one of a round robin authentication scheme, a one-to-one authorization scheme, and a group authorization scheme.

5. The method of claim 4, wherein the determining further comprises logging into the one or more of the plurality of provider sites using the one of the round robin authentication scheme, the one-to-one authorization scheme, and the group authorization scheme.

6. The method of claim 5, wherein the logging into the one or more of the plurality of provider sites is invisible to the user.

7. The method of claim 5, wherein different provider sites of the plurality of provider sites comprise different access credentials that are a unique one or more of the round robin authentication scheme, the one-to-one authorization scheme, and the group authorization scheme.

8. The method of claim 5, wherein the logging in fails because the multi-user subscriber account is associated with a limited number of licenses and the limited number of licenses are all being used.

9. A system comprising:
  a memory storing instructions; and
  a processor configured to access the memory to execute the instructions to remove paywalls associated with a plurality of provider sites to access subscribed content on the plurality of provider site, the instructions comprising at least:
    receive login information to an application from a user, wherein the user is an authorized user of a multi-user subscriber account, wherein the multi-user subscriber account is associated with a subscriber to the application having a plurality of users and the plurality of users of the multi-user subscriber account each have different associated permissions to access content from one or more of the plurality of provider sites through the application, wherein the user is associated with at least one associated permission to access content from one or more of the plurality of provider sites;
    verify that the login information is associated with the multi-user subscriber account associated with the subscriber to the application;
    receive instructions to access the one or more of the plurality of provider sites from the user through the application;
    determine that the one or more of the plurality of provider sites is associated with the multi-user subscriber account and the at least one associated permission of the user from the different associated permissions of each user of the plurality of users of the multi-user subscriber account;
    determine access credentials to the one or more of the plurality of provider sites based on a predetermined access scheme associated with the one or more of the plurality of provider sites; and
    inject the access credentials into the paywall associated with the one or more of the plurality of provider sites via the application based on the at least one associated permission.

10. The system of claim 9, wherein instructions are further executed by the processor to provide to the user access to the one or more of the plurality of provider sites based on the access credentials to the provider site.

11. The system of claim 10, wherein instructions are further executed by the processor to disable access to the one or more of the plurality of provider sites to the user based on the user not having permission to access the one or more of the plurality of provider sites in the multi-user subscriber account.

12. The system of claim 9, wherein the access credentials comprise one of a round robin authentication scheme, a one-to-one authorization scheme, and a group authorization scheme.

13. The system of claim 12, instructions are further executed by the processor to log into the one or more of the plurality of provider sites using the one of the round robin authentication scheme, the one-to-one authorization scheme, and the group authorization scheme.

14. The system of claim 13, wherein the logging into the one or more of the plurality of provider sites is hidden from the user.

15. The system of claim 13, wherein different provider sites of the one or more of the plurality of provider sites comprise different access credentials that are a unique one or more of the round robin authentication scheme, the one-to-one authorization scheme, and the group authorization scheme.

16. The system of claim 13, wherein the logging in fails because the multi-user subscriber account is associated with a limited number of licenses and the limited number of licenses are all being used.

17. The system of claim 9, wherein the injection of the access credentials into the paywalls associated with the one or more of the plurality of provider sites is camouflaged from the user.

18. The system of claim 17, wherein the injection is camouflaged by a removable overlay.

* * * * *